No. 733,904. PATENTED JULY 14, 1903.
A. H. DODD.
CARPET SWEEPER.
APPLICATION FILED SEPT. 2, 1899. RENEWED SEPT. 23, 1902.
NO MODEL. 3 SHEETS—SHEET 1.
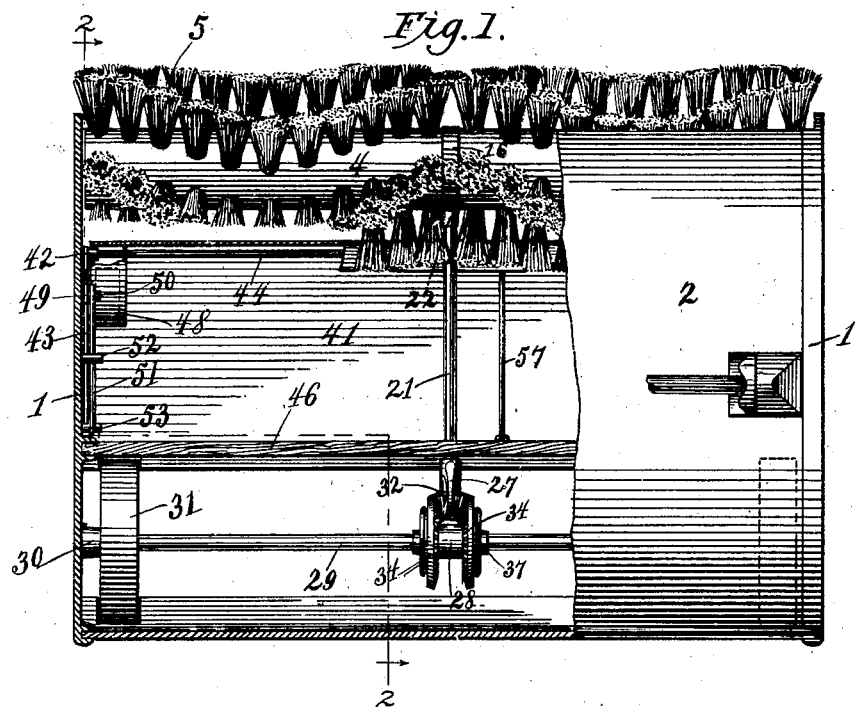
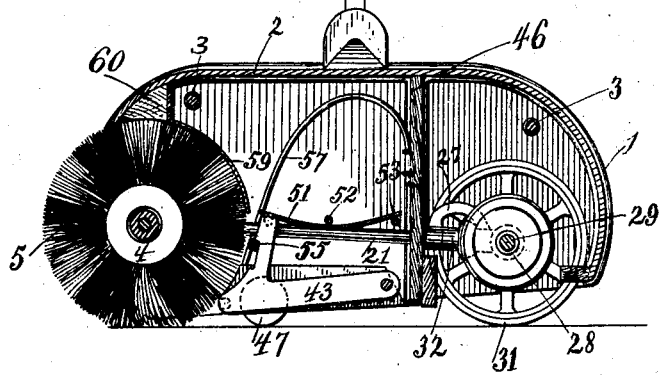
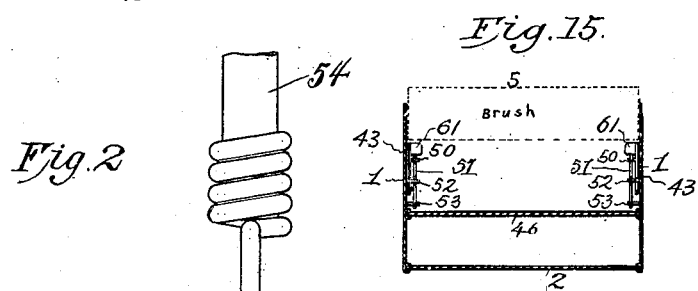
Witnesses
Inventor
Alvin H. Dodd,
Attorney No. 733,904. PATENTED JULY 14, 1903.
A. H. DODD.
CARPET SWEEPER.
APPLICATION FILED SEPT. 2, 1899. RENEWED SEPT. 23, 1902.
NO MODEL. 3 SHEETS—SHEET 2.
*Fig. 3.*
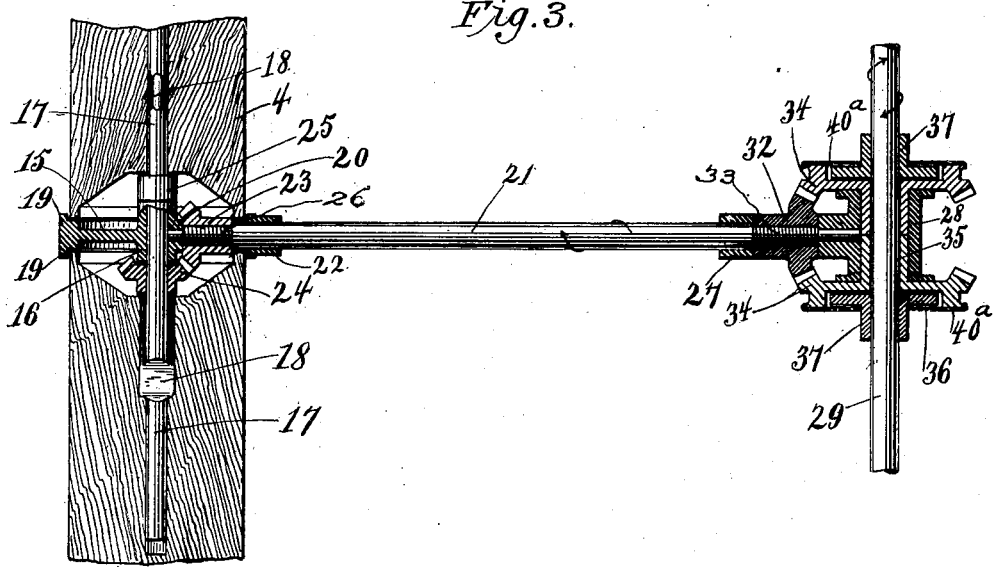
*Fig. 4.*    *Fig. 5.*    *Fig. 6.*
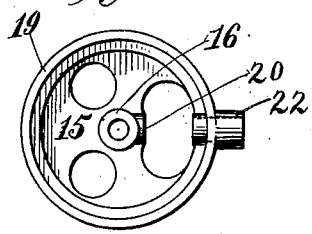 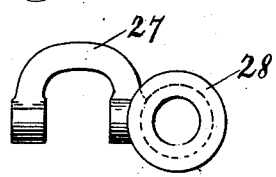 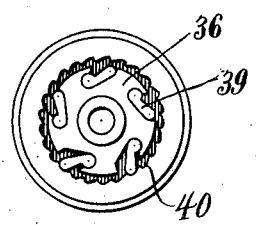
*Fig. 7.*
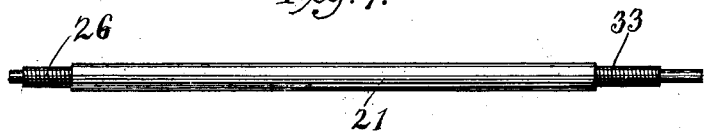
*Fig. 8.*    *Fig. 9.*
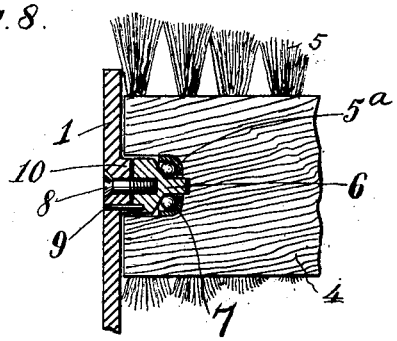 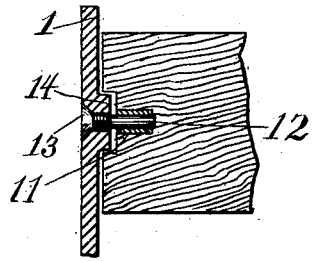
Witnesses
Sidney P. Hollingsworth
Chester A. Baker
Inventor
Alvin H. Dodd,
by _____
Attorney
THE NORRIS PETERS CO., PHOTO-LITHO., WASHINGTON, D. C.

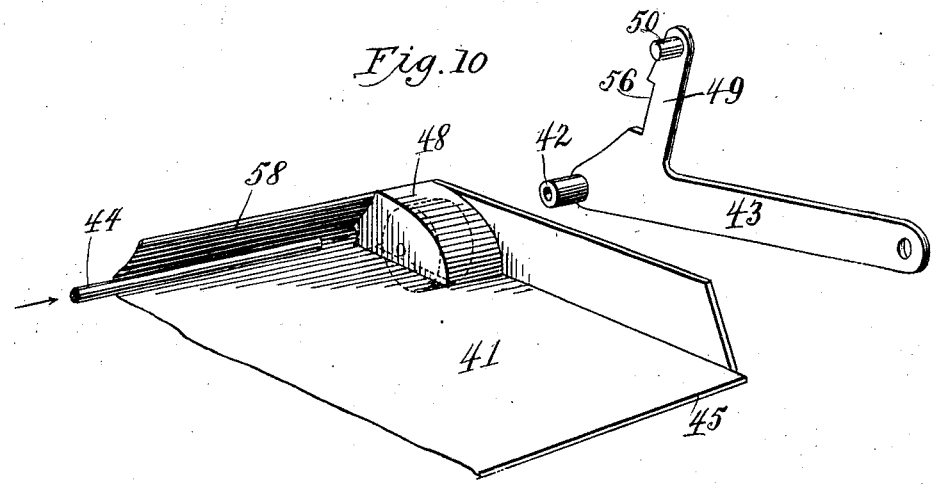
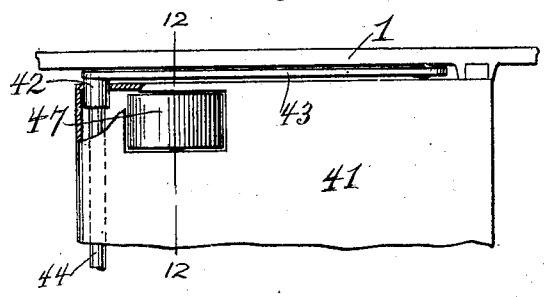
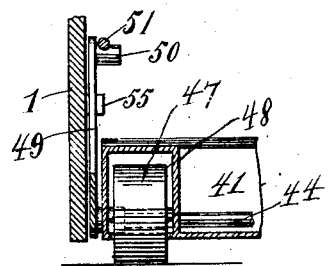
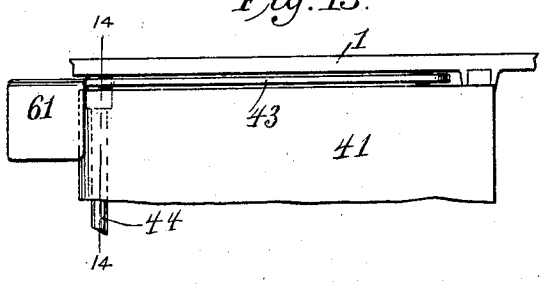
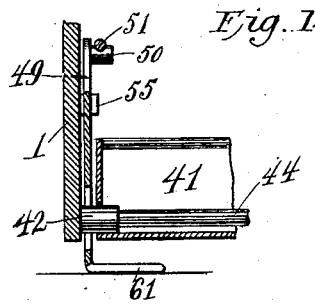

No. 733,904. Patented July 14, 1903.

UNITED STATES PATENT OFFICE.

ALVIN H. DODD, OF CHICAGO, ILLINOIS.

CARPET-SWEEPER.

SPECIFICATION forming part of Letters Patent No. 733,904, dated July 14, 1903.

Application filed September 2, 1899. Renewed September 23, 1902. Serial No. 124,601. (No model.)

*To all whom it may concern:*

Be it known that I, ALVIN H. DODD, a citizen of the United States, residing at Chicago, in the county of Cook and State of Illinois, have invented certain new and useful Improvements in Carpet-Sweepers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to carpet-sweepers; and it has for its object to construct a sweeper having the brush rotatable in the same direction in both the backward and forward movement of the sweeper, in which the mechanism for that purpose shall be composed of a minimum number of parts, so as to lighten the weight of the sweeper, lessen the cost of manufacture, and at the same time have the parts direct and positive in their action.

It has also for its object to so construct and arrange the parts that they will be efficiently housed against the entrance of dust or dirt to the working parts, which, if permitted, would impair the efficient working of the several parts.

It has also for its object to so construct and arrange the parts that in case the sweeper should strike more than an ordinary blow against any obstruction the parts will be cushioned, so that no injury will result from the blow.

It has also for its object to render the parts as noiseless as possible in their operation.

It has further for its object to provide improved means for sustaining the dust-pan and to so connect the same with the casing of the sweeper that the brush will normally be out of or but lightly in contact with the floor and yet may be readily brought into contact therewith when the sweeper is in operation.

To the accomplishment of the foregoing and such other objects as may hereinafter appear, the invention consists in the construction and also in the combination and arrangement of parts hereinafter particularly described and then sought to be clearly defined by the claims, reference being had to the accompanying drawings, forming a part hereof, and in which—

Figure 1 is a plan view of the sweeper with the casing partly broken away. Fig. 2 is a cross-section through the same on the line 2 2 of Fig. 1 looking in the direction of the arrows. Fig. 3 is a detail view of the driving-rod and the brush-core and their actuating parts with certain parts in section. Fig. 4 is a detail view of the ring or collar between the two sections of the brush-core. Fig. 5 is a detail side view of the yoke which sustains the driving-rod at the end next to the driving-shaft. Fig. 6 is a side view of one of the ratchet gear-wheels and one of the pawl or dog plates or disks with the protecting-cap removed. Fig. 7 is a detail view of the driving-rod. Fig. 8 is a detail sectional view of the brush-core and its ball-bearings. Fig. 9 is a detail view of the brush-core, showing a modified form of journal. Fig. 10 is a perspective of a portion of the dust-pan and of one of the supporting-arms for the same, the parts being separated. Fig. 11 is a bottom plan view of the parts shown in Fig. 10 with the parts assembled. Fig. 12 is a cross-section on line 12 12 of Fig. 11. Fig. 13 is a bottom plan view of the dust-pan and one of its supporting-arms, showing a flat shoe instead of a wheel for sustaining the brush normally raised. Fig. 14 is a cross-section on line 14 14 of Fig. 13. Fig. 15 is a bottom plan view containing the modification illustrated in Figs. 13 and 14.

In the drawings the numeral 1 indicates the sides of the casing, which may be made of metal, and 2 designates the shell of the casing, which preferably is made of light wood bent into shape, the sides and the shell being secured together by suitable tie-rods 3.

The numeral 4 designates the core of the brush, which is made of two parts divided transversely and provided with bristles 5, the brush being positioned so as to have it project in front of the casing, as illustrated in Figs. 1 and 2. The ends of the brush-core next to the side piece 1 are recessed and provided inside of the recess with a cup $5^a$ and also with a cone 6, balls 7 being located between the cup and cone, so as to form a ball-bearing, and a screw 8 passes through the side of the casing and enters the cone 6, the threaded connection between the screw and cone enabling the latter to be adjusted to regulate the ball-bearing. The cone is prevented from rotating by means of a pin 9, which passes through the side piece 1 and into the cone, as illustrated clearly in Fig. 8, thus allowing the brush-core to turn on the pintle portion of the cone without the latter turning. The side pieces 1 are also formed with bosses 10, which enter the recesses in the ends of the brush-core, as illustrated in both Figs. 8 and 9 of the drawings. By recessing the ends of the brush-core, so as to receive the parts of the journal-bearings and also the bosses of the side pieces, the bearings are so located and protected that trash is prevented from entering the bearings and impairing their efficient working.

Instead of having the parts constructed as described for Fig. 8 of the drawings they may be formed as illustrated in Fig. 9, in which modification the core is recessed and provided with a thimble 11, into which projects the smooth or pintle portion 12 of a screw 13, the threaded portion of which engages threads in the boss 14 of the side piece 1. The boss entering the recess of the brush-core prevents trash from coming into contact with the journal-bearing in the same manner as under the construction in Fig. 8 of the drawings.

Between the adjacent ends of the two sections of the brush-core there is located a ring or collar 15, which is provided with a hub 16, through which passes a metal rod 17, which serves to connect the members or sections of the brush-core, so as to make them practically one, rod 17 being secured in the two sections or members in any suitable way—for instance, by flattening a portion of the rod, as indicated at 18—so that the same will wedge tightly in the core. The rod 17 is free to turn in the hub 16 of the ring 15. The ring 15 is provided with lateral flanges or lips 19, which overlap the joint between the ring and the adjacent ends of the core-sections, and they serve to effectually prevent trash and dirt from entering between the ring and sections of the core, which if permitted would clog the working parts located within the ends on the members of the core and tend to impair their efficient working. The hub of the ring 15 is provided with a bearing 20 for the inner end of a driving-rod 21, and is also provided at its periphery with a sleeve 22, through which the driving-rod passes, the ring thus affording a bearing for the inner end of the driving-rod and also a bearing for the same at its periphery. The driving-rod at its inner end carries a beveled pinion or gear 23, which meshes with a beveled pinion or gear 24, secured to the rod 17 so as to turn therewith. The rod 17 is also preferably formed with a collar 25 at one side of the hub of the ring 15, as illustrated in Fig. 3. The adjacent ends of the two members of the core are hollowed out, as indicated in Fig. 3, so as to form a chamber for the reception of the beveled gears 23 and 24 and the central portion of the ring 15. The beveled gear 23 is preferably secured to the driving-rod 21 by screwing it onto the threaded portion 26 of the driving-rod, as illustrated. When the driving-rod 21 is rotated, the brush-core is caused to revolve by means of beveled gears 23 and 24. The opposite end of the driving-rod is supported in a yoke 27, which extends from a sleeve or collar 28, which encircles a shaft 29, that is journaled at its opposite ends in bosses 30, formed on the inner faces of the side pieces 1, said shaft having the supporting and driving wheels 31 secured thereto. This end of the driving-rod is provided with a beveled pinion 32, which is secured thereto in any suitable manner so as to turn with the rod, but preferably by being screwed onto the threaded portion 33 of the driving-rod, the portion of the driving-rod between the pinion and the driving-shaft 29 being smooth and having its bearing in the inner arm of the yoke 27, so as to turn therein, as illustrated in Fig. 3 of the drawings. The beveled pinion 32 meshes with two beveled gears 34, each of which has a hub 35 extending inwardly and fitting inside of the sleeve 28 of the yoke 27 and around the driving-shaft 29, so as to be free to revolve on said driving-shaft independently of each other. The outer face of each beveled gear 34 is recessed to form a chamber adapted to receive a disk or plate 36, each plate or disk having a hub 37 secured tightly to the driving-shaft 29 by frictional contact or otherwise, so as to rotate therewith. Each disk or plate 36 is provided with a series of gravitating pawls or dogs 39, adapted to be thrown outward in the rotation of the disk, so as to engage notches 40, formed in the circumferential wall of the chamber or recessed portion of the beveled gear, as illustrated in Fig. 6 of the drawings, so that when these pawls or dogs engage the notches in the wall of the chamber to the beveled gear said gear will be rotated with the disk, and thus be caused to transmit motion to the beveled pinion 32 and through it to the driving-rod 21. The notches in the wall of one beveled gear and the pawls or dogs to the disk or plate of the same gear are formed reversely to the corresponding parts in the other beveled gear and disk or plate, so that when the dogs and ratchet of one beveled gear and disk are in engagement with each other, so as to transmit motion from the driving-shaft to the beveled pinion 32, the ratchet and dogs of the other beveled gear 34 will be out of engagement with each other or inactive, so that no motion will be transmitted from that beveled gear. When, however, the direction of the rotation of the driving-shaft 29 is reversed, the dogs and ratchet of one beveled gear will be thrown out of engagement with each other and those of the other beveled gear into engagement, so that motion will be transmitted from such other beveled gear to the beveled pinion, and thence to the driving-rod. Under this construction the driving-rod 21 and the brush-core 24 will always be rotated in the same direction no matter in which direction the driving-shaft 29 may be turned, and therefore in either the backward or forward movement of the sweeper the brush will be revolved in one and the same direction. For the purpose of excluding dirt and trash from the dogs and their ratchets I provide each beveled gear 34 with a dust-proof cap 40$^a$, which will be made of thin metal, so as to be snapped into place over the edge of the beveled gear, as illustrated in Fig. 3 of the drawings.

By connecting the brush-core, the driving-shaft, and the driving-rod and arranging the power-transmitting beveled gears and pinions and connecting parts at the driving-shaft end of the driving-rod and the power-transmitting pinions at the core end of the driving-rod, as specified, a very simple and efficient construction and arrangement of parts is obtained for rotating the brush in one and the same direction whether the carpet-sweeper be moved backwardly or forwardly, and the parts are rendered practically noiseless in their operation, and rattling is avoided. Furthermore, if the parts, especially at the points of connection between the driving-shaft and driving-rod, should become loose by wear they can be readily tightened, so as to take up the wear, and thus render the parts firm and positive in their action without rattling and without noise. The active operating parts are also shielded or housed against the entrance of dust and trash, and hence the life of the parts greatly prolonged and their efficiency not in any wise impaired. This arrangement allows of more or less yielding of the parts in the direction of the length of the driving-rod in case of the sweeper being accidentally pushed with more or less force against any obstruction in the path of movement of the sweeper, and hence a cushioning effect is produced to an extent sufficient to prevent jarring and injury to the parts.

The numeral 41 designates a dust-pan which is supported at its end next to the brush by pintles 42, which extend inwardly from the ends of arms 43, which are pivoted at their opposite ends, so as to swing to the sides 1 of the casing, said pintles 42 passing through the sides of the dust-pan and being connected together by a rod 44, which passes across the dust-pan on the inside and has its ends bearing in the sockets 42, the free end of the dust-pan being formed with a lip 45, which when the pan is in its normal position rests against the under side of a partition 46, as indicated in Figs. 2, 11, and 13 of the drawings. The dust-pan in the form illustrated in Figs. 10 and 11 is provided at opposite sides near the end of the pan next to the brush with wheels 47, which are inclosed in housings 48, lying inside of the pan, the lower face of the wheels being adapted to rest upon the floor, as indicated in Figs. 2 and 12. From the forward portion of each swinging arm 43 extends upwardly an arm 49, which has a stud 50 projecting inwardly from its upper end, against which stud presses one end of a spring 51, which passes beneath a lug 52, projecting from the inside face of the casing, the other end of the spring resting on top of a lug 53, likewise projecting from the inner face of the side of the casing, said spring being under tension, so as to press the roller end of the dust-pan downwardly and lift the sweeper-casing, so that the brush will press but lightly, if at all, against the floor. When downward pressure is applied to the handle 54 of the sweeper-casing, the casing is depressed, so as to cause the brush to bear against the floor during the operation of sweeping, and when pressure is taken from off the handle the spring 51 lifts the casing, so that the brush will be in its normal position. A stud 55 projects from the inside face of the side of the casing and enters a notch 56, formed in one edge of the upwardly-extending arm 49, so as to restrain the upward movement of the casing by said stud bearing against the shoulder or upper wall of the notch, said stud bearing against the under shoulder or wall of the notch when the casing is depressed, and thus the upward-and-downward movement of the casing is restricted and the parts maintained in their proper position. By pivoting the rear ends of the arms 43 to the sides of the casing, as above described, said arms are allowed a swinging movement in the depressing and raising of the sweeper-casing, and in that way the dust-pan is maintained in its proper position in relation to the brush during the operation of sweeping. The free end of the dust-pan is held up in its normal position by means of a spring 57, which is connected at one end to the partition 46 and at the opposite end bears against the inwardly-inclined end 58 of the dust-pan. When the dust-pan is tilted for the purpose of discharging its contents, the spring 57 is compressed or contracted, and when pressure on the free end of the dust-pan is removed the spring 57 expands and restores the pan to its normal position and holds it in such position until the pan is again tilted for the purpose of discharging its contents. For the purpose of preventing the dust in the space of the casing above the dust-pan from settling on the top of the brush and also for the purpose of preventing dust or trash being carried outside of the casing in the rotation of the brush I provide a shield 59, which projects downwardly and inwardly from the strengthening-block 60 at the front of the casing, and it conforms to the curvature of the brush, so that it effectively prevents dust from settling on the brush and also prevents the brush from carrying trash to the outside of the casing.

Instead of using a wheel at the forward end of the dust-pan to contact with the floor I may provide a flat shoe 61, which will be formed as a part of the arm 43 and will contact with the floor, as illustrated in Fig. 14 of the drawings, thereby serving to support the casing and brush above the floor when not in operation and also permitting the casing and brush to be depressed during the operation of sweeping.

I have illustrated and described what I consider to be the best form and arrangement of the several parts; but it is obvious that changes can be made in the same and essential features of my invention still be retained.

Having described my invention and set forth its merits, what I claim is—

1. In a carpet-sweeper, the combination with the two-part brush-core connected to rotate together, of the ring or collar located between the adjacent ends of the two-part brush-core and having laterally-extending flanges or lips overlying the joint formed at the adjacent ends of said core, substantially as described.

2. In a carpet-sweeper, the combination with the casing and the brush-core, of the intermeshing pinions incased within a portion of the core, bearings for said pinions and a driving-rod for actuating said pinions, substantially as described.

3. In a carpet-sweeper, the combination with the two-part brush-core, of the ring or collar located between the two parts of the core, a rod connecting the two parts of the core, and rotatable in the hub of said ring or collar, a pinion connected to said rod, and a driving-rod having a bearing in said ring or collar and provided with a pinion meshing with the other pinion to rotate the brush-core, substantially as described.

4. In a carpet-sweeper, the combination with the two-part brush-core, of the ring or collar located between the two parts of the core and provided with a sleeve at its periphery, a rod connecting the two parts of the core and rotatable in the hub of said ring or collar, a driving-rod having a bearing in the sleeve and also in the hub of said ring, and intermeshing pinions incased within the brush-core and connected one to the rod uniting the two parts of the core and the other to the driving-rod, substantially as described.

5. In a carpet-sweeper, the combination with the brush-core and a driving-rod for transmitting motion thereto, of a gear on said driving-rod, a driving-shaft extending transversely to the driving-rod and provided with gears both of which mesh with the driving-rod gear, one of the gears on the driving-shaft operating to revolve the driving-rod when the driving-shaft is rotated in one direction and the other gear operating to revolve the driving-rod in the same direction when the driving-shaft is rotated in the opposite direction, substantially as described.

6. In a carpet-sweeper, the combination with the brush-core and a driving-rod for transmitting motion thereto, of a gear on said driving-rod, a driving-shaft extending transversely to the driving-rod and provided with gears, both of which mesh with the driving-rod gear and are mounted loosely on the driving-shaft, and a clutch mechanism for each of the gears mounted on the driving-shaft, the clutch mechanism of one gear acting reversely to that of the other gear, whereby one gear will be clutched automatically to the driving-shaft when the latter is rotated in one direction and the other gear clutched automatically thereto when the shaft is rotated in the opposite direction, substantially as described.

7. In a carpet-sweeper, the combination with the brush-core and a driving-rod for transmitting motion thereto, of a gear on said driving-rod, a driving-shaft extending transversely to the driving-rod and provided with gears both of which mesh with the driving-rod gear and are mounted loosely on the driving-shaft, ratchet-teeth or cavities formed on each of said two loosely-mounted gears, and disks or plates mounted on the driving-shaft to rotate therewith, said disks or plates provided with gravitating pawls or dogs adapted automatically in the rotation of the driving-shaft to engage with the ratchet-teeth or cavities of the gears, the ratchet-teeth or cavities and dogs of one gear and disk adapted to clutch said gear to the driving-shaft in the rotation of the shaft in one direction, and the corresponding parts of the other gear and disk adapted to effect automatically such clutching engagement when the shaft is rotated in the opposite direction, substantially as described.

8. In a carpet-sweeper, the combination with the brush-core and a driving-rod for transmitting motion thereto, of a driving-shaft extending transversely to the driving-rod, a sleeve or collar encircling the driving-shaft and provided with a yoke supporting one end of the driving-rod, gears provided with inwardly-extending hubs fitting loosely to the driving-shaft and entering the sleeve or collar which encircles the shaft, the gear secured to the driving-rod and meshing with said loosely-mounted gears, and mechanism for clutching one of the loosely-mounted gears to the driving-shaft in the rotation of said shaft in one direction, and the other gear thereto in the rotation of the shaft in the opposite direction, substantially as described.

9. In a carpet-sweeper, the combination with the rotatable shaft, of the gear-wheel mounted loosely thereon and formed in one face with a chamber or recess having its circumferential wall formed with ratchet-teeth or cavities, a disk or plate secured to the shaft to rotate therewith and provided with automatically-gravitating pawls or dogs to engage the teeth or cavities of the gear when the shaft is rotated in one direction, and a dust-proof cap adapted to snap over the chambered portion of the gears, substantially as described.

10. In a carpet-sweeper, the combination with the sweeper-casing, the brush, and the dust-pan, of swinging arms pivotally connected with the sweeper-casing next to the free end of the dust-pan and at the opposite end connected with a member to contact with the floor, and a spring connected with the sweeper-casing and with a part of one of said arms and serving to normally sustain the casing and the brush in a raised position and permitting the casing and brush to be lowered, substantially as described.

11. In a carpet-sweeper, the combination with the casing and a brush projecting in front of said casing, of swinging arms on both sides of the casing pivotally connected at one end to the sides of the casing and having shoes or projections extending from said arms to contact with the floor for the purpose of normally sustaining said casing and brush at a proper distance from the floor and springs secured to the casing and bearing against a portion of the swinging arms for automatic adjustment of said brush in relation to the floor, substantially as described.

12. In a carpet-sweeper, the combination with the casing, the brush, and the driving-shaft, of the rotatable power-transmitting shaft and gears connecting it with the brush and driving-shaft, said power-transmitting shaft being free from rigid connection with the sweeper-casing, and suitable bearings for said shaft, substantially as described.

13. In a carpet-sweeper, the combination with the brush, and driving-rod for transmitting motion thereto, and the driving-shaft, of the oppositely-arranged loosely-mounted gear-wheels, the gear-wheel intermediate of and meshing with said oppositely-arranged gear-wheels, and the disks or plates arranged one opposite to the inside face of each of the oppositely-arranged gear-wheels to maintain the gear-wheels in true, substantially as described.

14. In a carpet-sweeper, the combination with a driving-gear having an internally-notched annular portion, of a shaft provided with a disk or plate formed with sockets carrying gravitating and centrifugally-operating dogs, and frictional members on opposite sides of said socket-disk for engaging with the sides of the dogs in the movement of the socket-disk to assist in the gravitating and centrifugal movement of the dogs, substantially as described.

In testimony whereof I affix my signature in presence of two witnesses.

ALVIN H. DODD.

Witnesses:
C. D. BUTTERFIELD,
CHAS. DORRANCE.